3,439,006
METHOD OF PREPARING ORGANIC
SEMICONDUCTING MATERIALS
Yoshio Matsunaga, Stamford, Conn., assignor to American Cyanamid Company, Stamford, Conn., a corporation of Maine
No Drawing. Filed Nov. 2, 1964, Ser. No. 408,328
Int. Cl. C07c *45/00, 49/64*
U.S. Cl. 260—396     8 Claims

ABSTRACT OF THE DISCLOSURE

A method of preparing an organic molecular complex, possessing low resistance semiconducting properties is provided in which 1,6-diaminopyrene and a tetrahalogeno-p-benzoquinone are reacted in an inert ketonic aliphatic solvent whereby the so-formed complex finds utility in solid state semiconducting devices.

---

The present invention relates to a novel process for preparing organic semiconducting complexes. More particularly, it relates to a process for preparing semiconducting-organic molecular complexes utilizing an inert ketonic aliphatic solvent. Still more particularly, the invention is concerned with a process for preparing in a ketonic aliphatic solvent low resistance, semiconducting-organic molecular complexes derived from both 1,6-diaminopyrene comprising the electron donor and tetrahalo-p-benzoquinones comprising the electron acceptors.

The molecular complexes prepared by the process of the present invention possess enhanced properties of low resitsance, finding particular utility in solid state semiconductor devices exemplified by transistors, rectifiers, diodes, photocells, thermocouples and radiation detectors.

To the present, there is a paucity of organic semiconductive materials of simple molecular structures exhibiting desirable low resistivities of less than 100 ohm-cm. To provide the art with procedures for preparing organic semiconductive materials which are relatively simple in molecular configuration and of low resistivity would satisfy an ever constant growing need.

It is, therefore, a principal object of the invention to provide a straightforward and economical process for preparing molecular complexes which can be characterized as having relatively simple molecular structures and relatively low resistivities. It is a further object to provide organic semiconductive materials of low resistivity and comparative simple molecular structures prepared in a ketonic solvent system. These an other objects will become apparent from a consideration of the ensuing detailed description.

According to the present invention, a process for preparing new molecular complexes is provided, which complexes are characterized by the formula:

$$[D][A]_n$$

in which D represents 1,6-diaminopyrene as an electron donor moiety, A represents an electron acceptor moiety, more specifically, a tetrahalogeno-p-benzoquinone, and $n$ represents any value from 0.3 to 2. Each of the moieties, introduced in a ketonic menstruum, is present in varying molar proportions whereby a precipitate of the corresponding, desired semiconductor is obtained. Alternatively, the ketonic solution is evaporated so as to recover a deposit of evaporated semiconducting product.

The reactant which constitutes the electron acceptor may be represented by the structure:

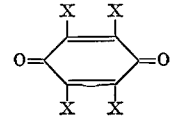

wherein X is either chlorine or bromine which may be the same or different. Exemplary quinones are: tetrachloro-p-benzoquinone; tetrabromo-p-benzoquinone; dichloro-dibromo-p-benzoquinone; and monobromo-trichloro-p-benzoquinone.

As stated above, the molecular complexes contemplated by the present invention can be prepared in a straightforward manner by mixing components comprising each of the moieties of the above-defined complex. For instances, one mol of 1,6-diaminopyrene can be reacted at room temperature with from 0.3 to 2 mols, and preferably from 1 to 1.8 mols, of a tetrahalogeno-p-benzoquinone in the presenct of an inert ketonic aliphatic solvent. The solvent is illustratively: acetone, methyl ethyl ketone, diethyl ketone, dibutyl ketone and methyl isopropylketone. Employing the ketonic solvent, resultant semiconducting complex possesses a resistivity equal to not more than 30 ohm-cm. In contrast therewith, the use of benzene as the solvent for instance, markedly increases the resistivity of resultant complex to at least $10^3$ ohm-cm.

Advantageously, temperatures ranging from about 20° C. to 40° C. are contemplated. Special equipment is not required to carry out the novel process since the reaction usually takes place under atmospheric pressure. Pressure equipment can be used where an inert atmosphere such as nitrogen or argon is provided.

The following examples are presented merely by way of illustration and are not to be deemed limitative of the present invention.

Example 1

0.46 g. (2 mols) of 1,6-diaminopyrene dissolved in 20 ml. of hot acetone maintained at 56° C. were added to 0.73 g. (3 mols) of p-chloranil in 50 ml. of hot acetone maintained at 56° C. After standing for one-half hour at room temperature, the black crystalline complex was filtered. The resistivity measured at room temperature with compressed samples was about 3 ohm-cm.

Calcd. for $(C_{16}H_{12}N_2)_1(C_6Cl_4O_2)_{1.5}$: C, 50.0%, H, 2.0%; N, 4.7%; Cl, 35.4%. Found: C, 51.7%; H, 3.1%; N, 4.8%; Cl, 31.9%.

Example 2

0.46 g. (2 mols) of 1,6-diaminopyrene dissolved in 20 ml. of hot acetone were added to 0.98 g. (4 mols) of p-chloranil in 50 ml. of hot acetone. After standing for ¼ hour the black crystalline product was filtered. The resistivity measured at room temperature with compressed samples was about 5 ohm-cm.

Calcd. for $(C_{16}H_{12}N_2)_1(C_6Cl_4O_2)_{1.5}$: C, 50.0%; H, 2.0%; N, 4.7%; Cl, 35.4%. Found: C, 49.3%; H, 2.8%; N, 4.3%; Cl, 35.4%.

Example 3

An acetone solution containing diaminopyrene and p-chloranil in a ratio as set forth in Table I below was evaporated to dryness at room temperature. The resistivity of the deposits was measured with compressed samples.

Table I

| Mol ratio (D:A) | Resistivity (ohm-cm.) |
|---|---|
| 1:1.2 | 13 |
| 1:1.4 | 6 |
| 1:1.6 | 4 |
| 1:1.8 | 3 |
| 1:2 | 4 |

Example 4

An acetone solution containing diaminopyrene and 2,5-dichloro-3,6-dibromo-p-benzoquinone in a mol ratio of 2:3 was evaporated to dryness at room temperature. The resistivity of the deposit measured with compressed samples was about 5 ohm-cm. Similar results are obtained with monochloro-tribromo-p-benzoquinone.

Example 5

An acetone solution containing diaminopyrene and 2,6-dichloro-3,5-dibromo-p-benzoquinone in a mol ratio of 2:3 was evaporated to dryness. The resistivity of the deposit measured with compressed samples was about 9 ohm-cm.

Employing as the quinone, 2,3-dichloro-5,6-dibromo-p-benzoquinone, in the above example, similar low resistivities are obtained.

Example 6

0.46 g. (2 mols) of 1,6-diaminopyrene dissolved in 20 ml. of hot acetone were added to 1.69 g. (4 mols) of p-bromanil in 150 ml. of hot acetone. After standing for fifteen minutes, the black crystalline product was filtered. The yield was 1.40 g. The resistivity measured at room temperature with compressed samples was about 3 ohm-cm.

Calcd. for $(C_{16}H_{12}N_2)(C_6Br_4O_2)$: C, 40.3%; H, 1.8%; N, 4.3%; Br, 48.8%. $(C_{16}H_{12}N_2)_2(C_6Br_4O_2)_3$: C, 34.6%; H, 1.4%; N, 3.2%; Br, 53.4%. Found: C, 36.8%; H, 1.8%; N, 2.9%; Br, 53.4%.

In determining the resistivity of the complexes of the present invention a four probe method is employed. Compressed complex having a 3/8" diameter is mounted on a resistivity test device (Model B manufactured by A & M Fell, Ltd., England) and the resistivity is read directly using a Keithly (Model 502) milliohm-meter.

Advantageously, the electrical resistivity of each of the complexes prepared above, measured at room temperature, do not exceed 30 ohm-cm. Substantially no increase of the resistivity even several months after preparation is observed.

I claim:
1. An improved method for prearing an organic molecular complex of the formula:

$$[D][A]_n$$

wherein D is the 1,6-diaminopyrene, A is a tetrahalogeno-p-benzoquinone and $n$ is any value from 0.3 to 2 which comprises: admixing in an inert ketonic aliphatic solvent 1 mol of 1,6-diaminopyrene and from 0.3 to 2 mols of a tetrahalogeno-p-benzoquinone selected from the group consisting of tetrachloro-p-benzoquinone, tetrabromo-p-benzoquinone, dichloro-dibromo-p-benzoquinone, monochloro-tribromo-p-benzoquinone and monobromo-trichloro-p-benzoquinone and separating the resultant complex.

2. The process according to claim 1 in which tetrachloro-p-benzoquinone is reacted.
3. The process according to claim 1 in which tetrabromo-p-benzoquinone is reacted.
4. The process according to claim 1 in which dibromo-dichloro-p-benzoquinone is reacted.
5. The process according to claim 1 in which monobromo-trichloro-p-benzoquinone is reacted.
6. The process according to claim 1 in which monochloro-tribromo-p-benzoquinone is reacted.
7. The process according to claim 1 in which the ketonic aliphatic solvent is acetone.
8. An improved method for preparing an organic molecular complex of the formula:

$$[D][A]_n$$

wherein D is the 1,6-diaminopyrene, A is a tetrahalogeno-p-benzoquinone and $n$ is any value from 0.3 to 2 which comprises: admixing in an inert ketonic aliphatic solvent selected from the group consisting of acetone, methyl ethyl ketone, diethyl ketone, dibutyl ketone and methyl isopropyl ketone, 1 mol of 1,6-diaminopyrene and from 0.3 to 2 mols of a tetrahalogeno-p-benzoquinone selected from the group consisting of tetrachloro-p-benzoquinone, tetrabromo-p-benzoquinone, dichloro - dibromo-p-benzoquinone, monochloro-tribromo-p-benzoquinone and monobromo-trichloro-p-benzoquinone, and separating the resultant complex.

References Cited

UNITED STATES PATENTS 3,255,392   6/1966   Wahlig _____ 317—234

OTHER REFERENCES

J. Chemical Physics, vol. 33, No. 3 (1960); Labes et al., pages 868 to 872 relied on.

LORRAINE A. WEINBERGER, *Primary Examiner.*

L. ARNOLD THAXTON, *Assistant Examiner.*

U.S. Cl. X.R.

317—234